United States Patent [19]
Jackson et al.

[11] Patent Number: 5,607,491
[45] Date of Patent: Mar. 4, 1997

[54] AIR FILTRATION MEDIA

[76] Inventors: Fred L. Jackson, 7259 W. Laurel Pl., Littleton, Colo. 80123; Kevin P. McHugh, 2596 S. Clarkson, Denver, Colo. 80210; John S. Robertson, 8676 W. Progress Pl., Littleton, Colo. 80123

[21] Appl. No.: 423,064

[22] Filed: Apr. 24, 1995

Related U.S. Application Data

[63] Continuation-in-part of Ser. No. 334,706, Nov. 4, 1994, Pat. No. 5,480,466, which is a continuation-in-part of Ser. No. 237,812, May 4, 1994, abandoned.

[51] Int. Cl.$^6$ ..................................... B01D 29/31
[52] U.S. Cl. .................... 55/528; 55/381; 55/DIG. 12; 162/157.3
[58] Field of Search .............................. 55/528, DIG. 12, 55/381, 382; 162/157.3

[56] References Cited

U.S. PATENT DOCUMENTS

| | | | |
|---|---|---|---|
| 2,626,214 | 1/1953 | Osborne | 162/157.3 X |
| 3,223,581 | 12/1965 | Sommer et al. | 162/157.3 |
| 3,307,332 | 3/1967 | Grace et al. | 55/528 X |
| 3,577,707 | 5/1971 | White | 55/528 X |
| 3,774,375 | 11/1973 | Smith | 55/528 X |
| 4,293,378 | 10/1981 | Klein | 55/528 X |
| 4,540,625 | 9/1985 | Sherwood | 55/528 X |
| 4,589,894 | 5/1986 | Gia et al. | 55/274 |
| 4,604,203 | 8/1986 | Kyle | 210/489 |
| 4,917,714 | 4/1990 | Kinsley, Jr. | 55/528 X |
| 4,917,942 | 4/1990 | Winters | 428/286 |
| 5,246,474 | 9/1993 | Greatorex | 55/528 X |
| 5,284,704 | 2/1994 | Kochesky et al. | 55/528 X |
| 5,320,891 | 6/1994 | Levy et al. | 55/528 X |
| 5,336,286 | 8/1994 | Alexander, Jr. et al. | 55/528 |
| 5,480,466 | 1/1996 | Jackson et al. | 55/528 |

FOREIGN PATENT DOCUMENTS

| | | | |
|---|---|---|---|
| 63-236512 | 10/1988 | Japan | 55/528 |

OTHER PUBLICATIONS

Polymer Engineering and Technology; Synthetic Fibers in Papermaking, Edited by O. A. Battista, Interscience Publishers, 1964, pp. 86–89.

*Primary Examiner*—Robert Spitzer
*Attorney, Agent, or Firm*—Cornelius P. Quinn

[57] ABSTRACT

An air filtration media comprises a single layer of randomly oriented and randomly intermingled synthetic, polymeric resin microfibers, staple fibers and bonding fibers. The microfibers, taken as a whole, have an average fiber diameter no greater than 5 microns and comprise between 50% and 90% by weight of the filtration media; the staple fibers, taken as a whole, have an average fiber diameter between 10 and 30 microns and typically, comprise between 5% and 45% by weight of the filtration media; and the bonding fibers, taken as a whole, have an average fiber diameter between 0.9 and 15 denier and comprise between 5% and 25% by weight of the filtration media. The bonding fibers have thermoplastic surfaces with a lower temperature softening point than the microfibers and the staple fibers and bond the fibers together to form the air filtration media.

26 Claims, 1 Drawing Sheet

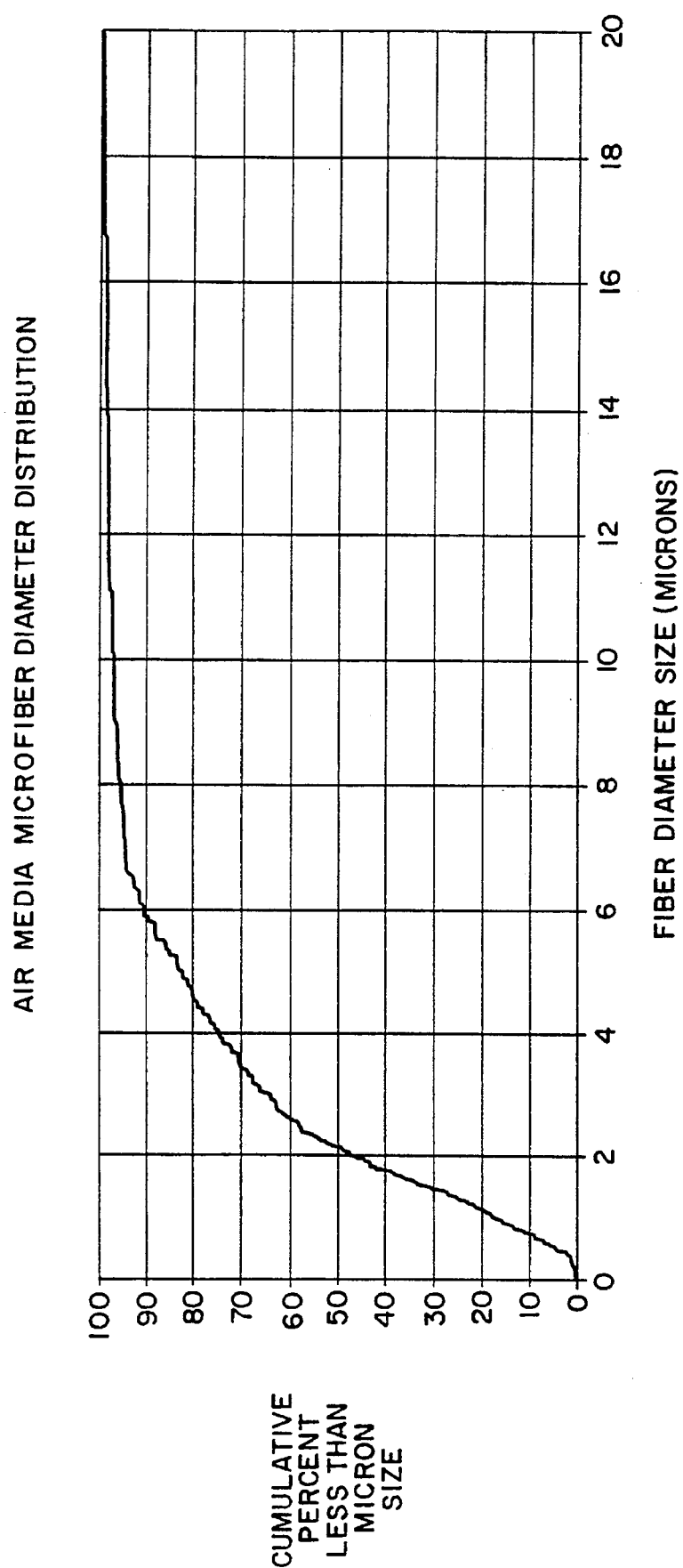

AIR FILTRATION MEDIA

This patent application is a continuation-in-part of U.S. application Ser. No. 08/334,706, filed Nov. 4, 1994, entitled AIR FILTRATION MEDIA, and now U.S. Pat. No. 5,480, 466, issued Jan. 2, 1996, which is a continuation-in-part of U.S. application Ser. No. 08/237,812, filed May 4, 1994, entitled AIR FILTRATION MEDIA and now adandoned.

BACKGROUND OF THE INVENTION

The present invention is directed to an air filtration media and, in particular, to a single layer, non-woven air filtration media comprising a blanket of randomly oriented and randomly intermingled polymeric microfibers, staple fibers and bonding fibers.

Heating, ventilating and air conditioning systems used in commercial and industrial buildings are provided with air filtration units to clean the air being circulated throughout the buildings. These air filtration units typically employ a sock type of filter with about six separate pockets, all of which are open at the upstream end and closed at the downstream end, to filter dirt particles from the air flowing through the heating, ventilating and air conditioning systems. The filter media presently used in these sock filters comprises a laminate of different fibrous blankets which each have different average fiber diameters and different functions. Frequently, one layer functions to remove coarse dirt particles from the air stream, a second layer functions to remove fine dirt particles from the air stream; and a third layer functions mainly as a supporting or backing layer.

These sock filters work satisfactorily. However, since two or more separate fibrous blankets must be combined into a single laminate of two or more layers prior to forming the sock filters, the sock filters presently in use are relatively expensive to fabricate. By eliminating the need to form the filter media used in the sock filters from a laminate of several different fibrous blankets, the costs and labor involved in producing the sock filters can be reduced. In addition, the filter manufacturer must now bear the expense of maintaining a relatively large inventory of different filter media blankets from which to fabricate sock filters meeting various operating or service requirements. Thus, there has been a need to provide a simpler, efficient filter media to reduce the filter manufacturer's labor requirements, fabrication costs and inventory requirements.

SUMMARY OF THE INVENTION

The air filtration media of the present invention provides a solution to the above discussed problems. The air filtration media of the present invention comprises a single layer of non-woven, randomly oriented and randomly intermingled finite length microfibers, staple fibers and bonding fibers. By maintaining inventories of several of the air filtration media blankets of the present invention, which are each designed to meet a specific range of air filtration service requirements, the sock filter manufacturer can eliminate both the need to maintain a relatively large inventory of separate air filtration media blankets and the need to combine and laminate these different blankets together to form the filter media needed for a particular service requirement. The sock filter manufacturer merely selects the appropriate single layered air filtration media blanket of the present invention which meets the particular service requirements and fabricates the sock filter or other filter needed for the air filtration system.

The thermoplastic microfibers used in the air filtration media of the present invention are synthetic, polymeric resin microfibers and, taken as a whole, have an average fiber diameter no greater than 5 microns. The polymeric microfibers impart filtration efficiency and particle holding capabilities to the air filtration media. As the average fiber diameter of the microfibers in the air filtration media increases, the air filtration media becomes less efficient and at average fiber diameters of over 5 microns, the efficiency of filtration media made in accordance with the present invention is unacceptable for most commercial applications.

Bulk melt-blown microfibers, having an average fiber diameter of 5 microns or less and preferably, 3 microns or less, can comprise all or a portion of the polymeric microfibers used in the air filtration media of the present invention. These bulk melt-blown microfibers can be made of polypropylene, polyethylene, polyester, polybutylene teraphthalate, polyethylene teraphthalate, polycarbonate, polyamide, polyphenylene sulfide, or other similar polymeric materials. These bulk microfibers not only increase the overall filtration efficiency of the air filtration media, due to their fine average fiber diameter (5 microns or less and preferably, 3 microns or less), but the bulk microfibers, used in the air filtration media of the present invention, have come from scrap microfibers created in the formation of microfiber sheets by the melt-blown process. Accordingly, the use of the bulk melt-blown microfibers in the air filtration media of the present invention forms an efficient air filtration media from a relatively inexpensive source of such microfibers and provides a use for such microfibers which would otherwise be scrap.

The thermoplastic staple fibers are also synthetic, polymeric resin fibers and, taken as a whole, have an average fiber diameter ranging between 10 and 30 microns. The staple fibers provide loft and strength to the filtration media thereby adding to the thickness of the filtration media, increasing the dirt or particle holding capacity of the filtration media and reducing the pressure drop across the filtration media. Polymeric fibers are relatively limp fibers. Accordingly, as the average diameter of the staple fibers used in the filtration media is decreased, the filtration media exhibits less loft and recovery. At average staple fiber diameters of less than 10 microns, the loft and recovery of the filtration media was not acceptable. It was also found that large diameter staple fibers (staple fibers having an average fiber diameter of 30 microns and above) do not blend or mix well with the microfibers or the bonding fibers, tending to become segregated within the air filtration media. Accordingly, these large diameter staple fibers are unacceptable for use in the air filtration media of the present invention.

Air filtration media of the present invention using staple fibers, having as a whole, an average fiber diameter of about 16 microns, performed at about the same efficiency as comparable glass fiber filtration media. However, the pressure drop across the air filtration media of the present invention was less than the pressure drop across the comparable glass fiber air filtration media. Thus, the air filtration media of the present invention provides the end user with a filter that requires less power to pass the air stream through the filter and a more energy efficient filtration system.

The staple fibers impart a resilience to the air filtration media so that the air filtration media will regain its original thickness after being compressed. This resilience or ability of the air filtration media to recover substantially its original thickness, allows the air filtration media to be compressed when packaged to reduce its volume for storage and shipment.

When heating, ventilating and air conditioning systems are shut down, the sock filters collapse and close. Certain sock filters have not always readily reopened when the heating, ventilating and air conditioning systems were brought back on line and the effectiveness and the efficiency of the system was adversely affected. The resilience imparted to the air filtration media of the present invention by the staple fibers facilitates the reopening of the sock filters when a heating, ventilating and air conditioning system is brought back on line after being shut down for servicing, etc.

The synthetic polymeric resin bonding fibers used in the air filtration media of the present invention have thermoplastic surface with a lower temperature softening point than the softening points of the polymeric microfibers and the staple fibers. The polymeric bonding fibers bond the fibers of the air filtration media blanket or mat together and give the blanket or mat strength and integrity. The greater the surface area presented by the bonding fibers, the better the bonding fibers bond the fibers of the air filtration media together. Accordingly, while the average diameter of bonding fibers used in the present invention, taken as a whole, ranges from 0.9 to 15 denier, it is preferred to use bonding fibers having an average fiber diameter, taken as a whole, between 2 and 6 denier.

The single layer air filtration media of the present invention provides a simple, inexpensive, efficient filter media having a relatively low pressure drop and good particle or dirt holding capacity. In addition, the air filtration media of the present invention, eliminates the need to form a laminate from different filtration media layers along with the added inventory and labor costs associated with such a manufacturing operation.

BRIEF DESCRIPTION OF THE DRAWING

The FIG. is a plot of the microfiber diameter distribution, measured optically, of the microfibers used in the air filtration media of the present invention.

DESCRIPTION OF THE PREFERRED EMBODIMENTS

The non-woven, fibrous air filtration media of the present invention comprises finite length synthetic polymeric resin microfibers, staple fibers and bonding fibers. The polymeric microfibers, the staple fibers and the bonding fibers are not segregated into separate layers within the air filtration mat or blanket. Rather, the polymeric microfibers, the staple fibers and the bonding fibers are randomly oriented and randomly intermingled in a single layer of air filtration media.

The air filtration mat or blanket of the present invention has a basis weight between 5 and 20 grams per square foot and, preferably, between 5 and 15 grams per square foot. The lighter weight air filtration media is preferred because the sock filters are easier to inflate and re-inflate when lighter air filtration media is used to form the sock filters. The air filtration mat or blanket is normally about ⅛ of an inch to about ¼ of an inch in thickness.

The finite length, thermoplastic, polymeric microfibers can be made from various synthetic, polymeric resins, such as, polyethylene, polypropylene, polyester, polyethylene teraphthalate, polybutylene, teraphthalate, polycarbonate, polyamide, polyphenylene sulfide, etc. or blends of the above listed polymers. However, since polypropylene fiberizes easily and is relatively inexpensive, polypropylene microfibers are preferred for use in the present invention.

While the polymeric microfibers used in the present invention are normally formed from a single polymeric material, where needed to impart a particular air filtration characteristic to the air filtration media, microfibers formed of a blend of polymeric materials or two or more different microfibers made of different polymeric materials can be used in the air filtration media of the present invention.

The polymeric microfibers used in the air filtration media of the present invention, taken as a whole, have an average fiber diameter between 0.5 and 5 microns and, preferably, an average fiber diameter between about 1 and 3 microns. The Figure graphically shows the microfiber diameter distribution of the microfibers used in one embodiment of the air filtration media of the present invention. The polymeric microfibers are random in length and range from about 1 inch to about 1½ inches in length.

Bulk melt-blown microfibers, which, taken as a whole, have an average fiber diameter of 5 microns or less and preferably, 3 microns or less, can comprise all or a portion of the polymeric microfibers used in the air filtration media of the present invention. These bulk melt-blown microfibers are produced by companies, such as, Web Dynamics Corporation and Minnesota Mining and Manufacturing Company, and can be made of any of the polymeric materials set forth above, but are typically made of polypropylene which is a relatively inexpensive polymer.

Typical test results obtained when using melt-blown microfibers in the air filtration media of the present invention are set forth in the following tables.

TABLE 1

Air Filtration Media Tested: 40% by weight melt-blown polypropylene microfibers averaging 3 microns or less in diameter; 30% by weight polypropylene microfibers averaging 4 microns or less in diameter; 16% CELBOND 255, 3 denier, polypropylene bonding fibers (averaging 16 to 20 microns in diameter); and 14% by weight polypropylene staple fibers averaging 10 to 12 microns in diameter.

| Sample | Initial Efficiency Particle Size .3–.5 microns | Basis Weight grams/sq. ft. | Pressure Drop inches of Wg. |
| --- | --- | --- | --- |
| 1 | 31 | 10.0 | 0.048 |
| 2 | 44 | 12.1 | 0.070 |
| 3 | 39 | 14.1 | 0.085 |
| 4 | 48 | 16.6 | 0.140 |
| 5 | 42 | 17.4 | 0.130 |
| 6 | 64 | 20.4 | 0.200 |
| 7 | 66 | 23.6 | 0.225 |
| 8 | 69 | 32.8 | 0.325 |

TABLE 2

Air Filtration Media Tested: 70% by weight melt-blown polypropylene microfibers averaging 3 microns or less in diameter; 16% CELBOND 255, 3 denier, polypropylene bonding fibers (averaging 16 to 20 microns in diameter); and 14% by weight polypropylene staple fibers averaging 10 to 12 microns in diameter.

| Sample | Initial Efficiency Particle Size .3–.5 microns | Basis Weight grams/sq. ft. | Pressure Drop inches of Wg. |
| --- | --- | --- | --- |
| 1 | 37 | 9.4 | 0.077 |
| 2 | 48 | 11.5 | 0.105 |
| 3 | 52 | 13.9 | 0.145 |
| 4 | 53 | 15.4 | 0.155 |
| 5 | 58 | 16.7 | 0.180 |
| 6 | 61 | 17.1 | 0.170 |

TABLE 2-continued

Air Filtration Media Tested: 70% by weight melt-blown polypropylene microfibers averaging 3 microns or less in diameter; 16% CELBOND 255, 3 denier, polypropylene bonding fibers (averaging 16 to 20 microns in diameter); and 14% by weight polypropylene staple fibers averaging 10 to 12 microns in diameter.

| Sample | Initial Efficiency Particle Size .3–.5 microns | Basis Weight grams/sq. ft. | Pressure Drop inches of Wg. |
|---|---|---|---|
| 7 | 54 | 17.4 | 0.170 |
| 8 | 63 | 20.0 | 0.180 |
| 9 | 66 | 24.4 | 0.265 |

TABLE 3

Air Filtration Media Tested: 45% by weight melt-blown polypropylene microfibers averaging 3 microns or less in diameter; 45% polypropylene microfibers averaging 4 microns or less in diameter; and 10% by weight CELBOND 255, 3 denier, polypropylene bonding fibers (averaging 16 to 20 microns in diameter).

| Sample | Initial Efficiency Particle Size .3–.5 microns | Basis Weight grams/sq. ft. | Pressure Drop inches of Wg. |
|---|---|---|---|
| 1 | 59 | 10.4 | 0.125 |
| 2 | 56 | 11.8 | 0.135 |
| 3 | 67 | 12.1 | 0.150 |
| 4 | 64 | 14.2 | 0.185 |
| 5 | 58 | 14.5 | 0.170 |

TABLE 4

Air Filtration Media Tested: 36% by weight melt-blown polypropylene microfibers averaging 3 microns or less in diameter; 34% by weight polypropylene microfibers averaging 4 microns or less in diameter; 16% by weight CELBOND 255, 3 denier, polypropylene bonding fibers (averaging 16 to 20 microns in diameter) and 14% by weight polypropylene fibers averaging 10 to 12 microns in diameter.

| Sample | Initial Efficiency Particle Size .3–.5 microns | Basis Weight grams/sq. ft. | Pressure Drop inches of Wg. |
|---|---|---|---|
| 1 | 46 | 10.1 | 0.090 |
| 2 | 47 | 12.3 | 0.100 |
| 3 | 41 | 13.4 | 0.109 |
| 4 | 50 | 14.7 | 0.120 |
| 5 | 56 | 15.3 | 0.143 |
| 6 | 46 | 15.9 | 0.120 |
| 7 | 57 | 18.3 | 0.145 |
| 8 | 61 | 20.9 | 0.180 |

The thermoplastic staple fibers used in the air filtration media of the present invention, are normally formed from a synthetic, polymeric resin, such as, polyethylene, polypropylene, polyester, polyethylene teraphthalate, polybutylene teraphthalate, polycarbonate, polyamide, polyphenylene sulfide or blends of the above listed polymers. The staple fibers, taken as a whole, have an average fiber diameter between 10 and 30 microns and, preferably, have an average fiber diameter between 10 and 20 microns. The average length of the staple fibers is between about ½ of an inch and about 2 inches and, preferably, the average length is about 1½ inches.

The synthetic, polymeric resin bonding fibers used in the non-woven, air filtration media of the present invention have thermoplastic surfaces with a lower temperature softening point than the softening points of the polymeric microfibers and the staple fibers. The polymeric bonding fibers normally used in the air filtration media are sheathed fibers having a polyethylene, polypropylene, polyester, polyethylene teraphthalate, polybutylene teraphthalate, polycarbonate, polyamide, polyphenylene sulfide or other thermoplastic polymer core. The core is coated with a polyolifin, a polypropylene, or a polyethylene material having a lower temperature softening point than the polymeric microfibers and the staple fibers. While polymers of the same type, such as, polypropylene, may be used to form the sheaths of the bonding fibers as well as the microfibers and/or the staple fibers, the specific molecular weight of the polymer selected for the bonding material of the sheath is chosen to give the bonding material a lower temperature softening point than either the microfibers or the staple fibers. The lower temperature softening point of the surfaces of the bonding fibers allows the surfaces of the bonding fibers to become tacky, when the air filtration media is heated, to effect the bonding of the fibers within the air filtration media of the present invention without adversely affecting the physical properties or integrity of the microfibers or the staple fibers in the air filtration media. Preferably, the softening point of the surfaces of the bonding fibers, which is typically between 110° and 130° Centigrade, is at least 10° to 15° Centigrade lower than the softening point of either the microfibers or the staple fibers.

The bonding fibers, taken as a whole, have an average fiber diameter between 0.9 and 15 denier and preferably, between about 2 and about 6 denier. The polymeric bonding fibers have a length between about ½ of an inch and 2 inches and preferably, length of about 1½ inches.

One embodiment of the air filtration media of the present invention comprises: 50% to 90% by weight polymeric microfibers; 5% to 45% by weight polymeric staple fibers and 5% to 25% by weight polymeric bonding fibers. As the percentage by weight of the polymeric bonding fibers in the air filtration media is decreased, the air filtration blanket or mat exhibits progressively less integrity. When the percentage by weight of bonding fibers in the air filtration media is substantially less than 10%, fibers from the air filtration blanket or mat may be carried away by a high velocity air stream flowing through the filter making the air filtration media unacceptable for certain applications. Accordingly, in preferred embodiments of the present invention, the percentage by weight of the polymeric bonding fibers in the air filtration media is maintained at or above 10%. One such embodiment comprises: 50% to 85% by weight polymeric microfibers; 5% to 40% by weight polymeric staple fibers and 10% to 25% by weight polymeric bonding fibers.

While an air filtration blanket or mat having 10% by weight polymeric bonding fibers has sufficient strength and integrity for most applications, as the percentage by weight of bonding fibers in the air filtration blanket or mat is progressively increased from 10% to 25% by weight, the blanket or mat exhibits progressively greater strength and integrity and can be used for more demanding applications. However, as the percentage by weight of the polymeric bonding fibers approaches 25% by weight of the air filtration media, the increased strength and integrity provided by the additional bonding fibers is normally outweighed by the increased cost attributed to the use of the bonding fibers rather than the less expensive staple fibers. Accordingly, in most applications, the percentage by weight of the polymeric bonding fibers in the air filtration media will be below 25% and frequently at or about 20%.

The polymeric microfibers are the most effective of the three fibers for filtering dirt from the air passing through the air filtration media and for holding the dirt within the air filtration media. However, like the polymeric bonding fibers, the polymeric microfibers are more expensive than the polymeric staple fibers. Thus, only enough polymeric microfibers are incorporated into the filtration mat or blanket to give the mat or blanket the air filtration efficiency required for the particular service requirements.

The use of staple fibers in the air filtration media of the present invention provides an efficient air filtration product at a relatively low cost. As discussed above, the staple fibers are less expensive than either the polymeric microfibers or the polymeric bonding fibers. Therefore, rather than increasing the percentage by weight of polymeric microfibers above that required to give the mat or blanket the required filtration efficiency for a particular application or increasing the percentage by weight of the bonding fibers above that required to provide the filtration media with the integrity required for a particular application, the less expensive staple fibers are normally used in the filtration media to keep the cost of the air filtration media as low as practical.

In addition, the staple fibers give the filtration media loft, strength and resiliency. The added loft provided by the staple fibers increases the dirt holding capacity of the filtration media. The added resilience provided by the staple fibers facilitates both the recovery of the filtration media from compression when the filtration media has been vacuum packaged for shipment and storage and the recovery of sock filters made from the filtration media when the filters are deflated and reinflated in service.

As discussed above, the efficiency of the air filtration media of the present invention increases as the percentage by weight of the polymeric microfibers in the air filtration media is increased. Thus, a relatively lower efficiency embodiment of the air filtration media of the present invention comprises: about 50% to about 60% by weight polymeric microfibers; about 20% to about 40% by weight staple fibers; and about 10% to about 25% by weight bonding fibers. An intermediate efficiency embodiment of the air filtration media of the present invention comprises: about 60% to about 75% by weight polymeric microfibers; about 5% to about 30% by weight polymeric staple fibers; and about 10% to about 25% by weight polymeric bonding fibers. A high efficiency embodiment of the air filtration media of the present invention comprises about 75% to about 85% by weight polymeric microfibers; about 5% to about 15% by weight polymeric staple fibers and about 10% to about 20% by weight polymeric bonding fibers.

In one high efficiency, relatively low capacity, embodiment of the air filtration media of the present invention, the filtration media comprises only polymeric microfibers and polymeric bonding fibers. The staple fibers, which are normally used to increase the loft and dirt holding capacity of the filtration media, are not present in this embodiment of air filtration media. The air filtration media of this embodiment comprises about 65% to 90% by weight polymeric microfibers and about 10% to 35% by weight polymeric bonding fibers.

Air filtration media of the present invention was tested to determine its efficiency. The test used particles between 0.3 and 0.5 microns in diameter. The microfibers, taken as a whole, had an average fiber diameter between 0.5 and 5 microns; the staple fibers, taken as a whole, had an average fiber diameter between 10 and 30 microns; and the bonding fibers, taken as a whole, had an average fiber diameter between 10 and 30 microns. The test results were as follows:

| Efficiency | | % by Weight | % by Weight | % by Weight |
| --- | --- | --- | --- | --- |
| Initial | Overall | Microfibers | Staple Fibers | Bonding Fibers |
| 10% | 45% | 50 | 30 | 20 |
| 25% | 65% | 60 | 20 | 20 |
| 55% | 85% | 70 | 10 | 20 |
| 64% | 95% | 80 | 00 | 20 |

The air filtration media of the present invention is formed by blending the polymeric microfibers, the polymeric staple fibers and the polymeric bonding fibers in a conventional carding machine or a similar machine, such as, a RANDO-WEBBER machine made by the Rando Machine Corporation of Macedon, New York. Once the blanket or mat of non-woven randomly oriented and randomly intermingled polymeric microfibers, polymeric staple fibers and polymeric bonding fibers is formed in the carding process, the blanket or mat of air filtration media is heated to the softening point of the thermoplastic surfaces of the polymeric bonding fibers to bond the fibers of the air filtration media together and form the finished air filtration media product which can then be fabricated into sock filters and the like.

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. A non-woven, fibrous blanket of air filtration media comprising:

finite length, synthetic polymeric resin microfibers; said microfibers, taken as a whole, having an average fiber diameter between 0.5 and 5 microns; said microfibers having a softening point; and said microfibers comprising between 50% and 90% by weight of the air filtration media;

finite length, synthetic polymeric resin staple fibers; said staple fibers, taken as a whole, having an average fiber diameter between 10 and 30 microns; said staple fibers having a softening point; and said staple fibers comprising between 5% and 45% by weight of the air filtration media;

finite length, synthetic polymeric resin bonding fibers; said bonding fibers, taken as a whole, having an average fiber diameter between 0.9 and 15 denier; said bonding fibers having thermoplastic surfaces with a lower temperature softening point than the softening points of said microfibers and said staple fibers; and said bonding fibers comprising between 5% and 25% by weight of the air filtration media; and said microfibers, said staple fibers, and said bonding fibers being randomly oriented and randomly intermingled in a blanket; and said bonding fibers bonding said microfibers, said staple fibers and said bonding fibers together to form said blanket.

2. The air filtration media of claim 1, wherein: said microfibers comprise between 50% and 85% by weight of the air filtration media; said staple fibers comprise between 5% and 40% by weight of the air filtration media; and said bonding fibers comprise between 10% and 25% by weight of the air filtration media.

3. The air filtration media of claim 1, wherein: said microfibers comprise between 50% and 60% by weight of the air filtration media; said staple fibers comprise between 20% and 40% by weight of the air filtration media; and said bonding fibers comprise between 10% and 25% by weight of the air filtration media.

4. The air filtration media of claim 3, wherein: said microfibers are made of polypropylene.

5. The air filtration media of claim 4, wherein: said blanket has a basis weight between 5 and 20 grams per square foot and is about 1/8 of an inch to about 1/4 of an inch thick.

6. The air filtration media of claim 1, wherein: said microfibers comprise between 60% and 75% by weight of the air filtration media; said staple fibers comprise between 5% and 30% by weight of the air filtration media; and said bonding fibers comprise between 10% and 25% by weight of the air filtration media.

7. The air filtration media of claim 6, wherein: said microfibers are made of polypropylene.

8. The air filtration media of claim 7, wherein: said blanket has a basis weight between 5 and 20 grams per square foot and is about 1/8 of an inch to about 1/4 of an inch thick.

9. The air filtration media of claim 1, wherein: said microfibers comprise between 75% and 85% by weight of the air filtration media; said staple fibers comprise between 5% and 15% by weight of the air filtration media; and said bonding fibers comprise between 10% and 20% by weight of the air filtration media.

10. The air filtration media of claim 9, wherein: said microfibers are made of polypropylene.

11. The air filtration media of claim 10, wherein: said blanket has a basis weight between 5 and 20 grams per square foot and is about 1/8 of an inch to about 1/4 of an inch thick.

12. The air filtration media of claim 1, wherein: said microfibers, taken as a whole, have an average fiber diameter between 1 and 3 microns; said staple fibers, taken as a whole, have an average fiber diameter between 10 and 20 microns; and said bonding fibers, taken as a whole, have an average fiber diameter between 2 and 6 denier.

13. The air filtration media of claim 12, wherein: said microfibers comprise between 50% and 85% by weight of the air filtration media; said staple fibers comprise between 5% and 40% by weight of the air filtration media; and said bonding fibers comprise between 10% and 25% by weight of the air filtration media.

14. The air filtration media of claim 12, wherein: said microfibers comprise between 50% and 60% by weight of the air filtration media; said staple fibers comprise between 20% and 40% by weight of the air filtration media; and said bonding fibers comprise between 10% and 25% by weight of the air filtration media.

15. The air filtration media of claim 14, wherein: said microfibers are made of polypropylene.

16. The air filtration media of claim 15, wherein: said blanket has a basis weight between 5 and 20 grams per square foot and is about 1/8 of an inch to about 1/4 of an inch thick.

17. The air filtration media of claim 12, wherein: said microfibers comprise between 60% and 75% by weight of the air filtration media; said staple fibers comprise between 5% and 30% by weight of the air filtration media; and said bonding fibers comprise between 10% and 25% by weight of the air filtration media.

18. The air filtration media of claim 17, wherein: said microfibers are made of polypropylene.

19. The air filtration media of claim 18, wherein: said blanket has a basis weight between 5 and 20 grams per square foot and is between about 1/8 of an inch and about 1/4 of an inch thick.

20. The air filtration media of claim 12, wherein: said microfibers comprise between 75% and 85% by weight of the air filtration media; said staple fibers comprise between 5% and 15% by weight of the air filtration media; and said bonding fibers comprise between 10% and 20% by weight of the air filtration media.

21. The air filtration media of claim 20, wherein: said microfibers are made of polypropylene.

22. The air filtration media of claim 21, wherein: said blanket has a basis weight between 5 and 20 grams per square foot and is between about 1/8 of an inch and about 1/4 of an inch thick.

23. The air filtration media of claim 12, wherein: said microfibers comprise melt-blown microfibers.

24. The air filtration media of claim 1 wherein: said microfibers comprise melt-blown microfibers.

25. A non-woven, fibrous blanket of air filtration media comprising:

finite length, synthetic polymeric resin microfibers: said microfibers, taken as a whole, having an average fiber diameter of between 1 and 3 microns; said microfibers having a softening point; and said microfibers comprising between 65% and 90% by weight of the air filtration media;

finite length, synthetic polymeric resin bonding fibers; said bonding fibers, taken as a whole, having an average fiber diameter between 2 and 6 denier; said bonding fibers having thermoplastic surfaces with a lower temperature softening point than the softening point of the microfibers; and said bonding fibers comprising between 10% and 35% by weight of the air filtration media; and said microfibers and said bonding fibers being randomly oriented and intermingled in a blanket; and said bonding fibers bonding said microfibers and said bonding fibers together to form a blanket.

26. The air filtration media of claim 25, wherein: said microfibers comprise melt-blown microfibers.

* * * * *